United States Patent [19]

Sjögreen

[11] 3,953,358
[45] Apr. 27, 1976

[54] MELTS OF POLYHYDRIC ALCOHOLS AS STABILIZERS FOR VINYL CHLORIDE POLYMERS

[75] Inventor: Carl-Axel E. Sjögreen, Perstorp, Sweden

[73] Assignee: Perstorp AB, Perstorp, Sweden

[22] Filed: Oct. 16, 1973

[21] Appl. No.: 406,936

[30] Foreign Application Priority Data
Nov. 13, 1972 Sweden .......................... 14680/72

[52] U.S. Cl. .......................... 252/407; 260/23 XA; 260/42.44; 260/45.95 P; 260/45.95 L; 260/92.8 AC; 526/45
[51] Int. Cl.² .................. C09K 15/06; C08L 91/00; C08K 9/00; C08K 5/05
[58] Field of Search ............. 252/407; 260/45.95 P, 260/45.95 L, 92.8 AC, 23 XA, 42.44

[56] References Cited
UNITED STATES PATENTS

| | | | |
|---|---|---|---|
| 2,961,406 | 11/1960 | McNeil | 252/407 |
| 3,193,525 | 7/1965 | Kallert | 260/45.95 P |
| 3,337,495 | 8/1967 | Corbett | 260/45.95 S |
| 3,355,423 | 11/1967 | Scullin | 260/45.95 |
| 3,390,111 | 6/1968 | Scullin | 260/45.95 L |
| 3,429,844 | 2/1969 | Neros | 260/45.95 L |
| 3,453,225 | 7/1969 | Pollock | 252/407 |
| 3,454,517 | 7/1969 | Neros | 260/30.4 |
| 3,463,832 | 8/1969 | Wollrab | 260/45.95 L |
| 3,576,918 | 4/1971 | Rattenbury | 260/45.95 L |
| 3,576,919 | 4/1971 | Rattenbury | 260/45.95 L |
| 3,779,985 | 12/1973 | Heuser | 260/45.95 L |

FOREIGN PATENTS OR APPLICATIONS

| | | |
|---|---|---|
| 1,375,977 | 9/1963 | France |
| 1,513,705 | 2/1967 | France |

OTHER PUBLICATIONS
Rose, The Condensed Chemical Dictionary, Van Nostrand Reinhold, Co., 7th Ed. 1966, p. 633.

*Primary Examiner*—Benjamin R. Padgett
*Assistant Examiner*—Donald P. Walsh
*Attorney, Agent, or Firm*—Stevens, Davis, Miller & Mosher

[57] ABSTRACT

Secondary stabilizer for vinyl chloride polymers, which stabilizer consists of a solid mixture obtained by melting together trimethylol propane and pentaerythritol and optionally one or more of the compounds selected from the group consisting of dipentaerythritol, tripentaerythritol, neopentyl glycol, trimethylol ethane, ditrimethylol propane, mannitol, sorbitol, anhydroennea heptitol, 1,2,6-hexane triol and glycerol.

3 Claims, No Drawings

MELTS OF POLYHYDRIC ALCOHOLS AS STABILIZERS FOR VINYL CHLORIDE POLYMERS

The present invention relates to a secondary stabilizer for vinyl chloride polymers and a process for the production thereof. The stabilizer is preferably intended for polyvinyl chloride. However, it is advantageous to use it also for other similar polymers such as after-chlorinated polyvinyl chlorides, copolymers of vinyl chloride and vinyl acetate, copolymers of vinyl chloride and styrene and others.

Certain vinyl polymers, especially polyvinyl chloride (PVC), demand an addition of stabilizers to prevent a decomposition of the polymer at elevated temperatures, for instance at the working temperatures. Organic stannic compounds are probably the best individual stabilizers for this purpose. However, they are rather expensive and they often give unsuitable smells.

Also polyvalent metal salts of organic acids can be used as stabilizers for PVC. However, they must be combined with secondary stabilizers to give the same effect as the organic stannic compounds. Such secondary stabilizers are for example organic phosphites, organic sulphur compounds, epoxy compounds and polyhydric alcohols such as pentaerythritol and trimethylol propane (TMP). Usually several of these secondary stabilizers are used at the same time together with the polyvalent metal salts of organic acids. Such combinations of metal salt and secondary stabilizers are mentioned for instance in the U.S. Pat. Nos. 2,564,646, 2,711,401 and 3,003,999.

It is often suitable that the pre-blended stabilizer mixture is available in the shape of a fine powder. If polyhydric alcohols shall be used as secondary stabilizers in such a mixture, they must have such qualities that they can be incorporated into the mixture in a satisfactory way. Thus the alcohols must be solid products which can be produced in the shape of a fine powder. It is also desirable that the polyhydric alcohols have a large number of hydroxy groups per molecule, since the stabilizing effect is related to the number of hydroxy groups.

The polyhydric alcohols being available commercially in large quantities are mainly pentaerythritol, TMP and sorbitol and other alcohols based on sugar. Sorbitol and alcohols based on sugar have their greatest use in such connections where the demand for unpoisonousness is great, for example at food packages. However, these alcohols suffer from the disadvantage to have a limited thermal stability. Therefore a PVC composition containing such an alcohol as a stabilizer may be discolored when it is subjected to high temperatures at the working or on later occasions.

Pentaerythritol has a high thermal stability and a high hydroxy equivalence and it can be produced as a fine powder. However, owing to its strong polarity and high melting point it has the disadvantage to be little soluble in the PVC, which sometimes results in a wandering of pentaerythritol particles out of the plastic material. Then white coatings appear on the surface of the shaped plastic product and on the moulding apparatus. Moreover, as a consequence of the low solubility, the transparency of the finished plastic product is often decreased by the muddiness caused by undissolved pentaerythritol particles.

TMP has a high thermal stability and a high hydroxy equivalence too. Owing to its lower polarity, TMP is much more soluble than pentaerythritol in PVC. However, due to its low melting point (about 58°C) TMP cannot be produced powdered without great difficulties.

There is a strong desire to be able to combine the good qualities of the TMP and the pentaerythritol and to eliminate their negative qualities at the same time.

According to the present invention the above desire has been met and a stabilizer for vinyl chloride polymers has been brought about.

The stabilizer is characterized in that it consists of a solid mixture obtained by melting together trimethylol propane and pentaerythritol and optionally one or more of the compounds selected from the group consisting of dipentaerythritol, tripentaerythritol, neopentyl glycol, trimethylol ethane, ditrimethylol propane, mannitol, sorbitol, anhydroennea heptitol, 1,2,6-hexane triol and glycerol.

The stabilizer according to the invention has a lower polarity and a lower melting point than pure pentaerythritol, which gives a very much improved compatibility with PVC. Furthermore, the stabilizer has a considerably higher melting point than pure TMP. Thereby it can easily be produced in a finely powdered shape.

The favourable effect according to the invention is not obtained if TMP and pentaerythritol are mixed separately into a stabilizer mixture and then added to a PVC mass. Then they will function as the separate components, each of them with its own disadvantages.

A preferred stabilizer according to the invention consists of a solid mixture obtained by melting together TMP, pentaerythritol, dipentaerythritol and tripentaerythritol.

The stabilizer can consist of a solid mixture obtained by melting together 74 – 12 per cent by weight of TMP, 26 – 75 per cent by weight of pentaerythritol, 0 – 10 per cent by weight of dipentaerythritol and 0 – 3 per cent by weight of tripentaerythritol. Preferably a mixture of 71.5 – 49 per cent by weight of TMP, 25 – 40 percent by weight of pentaerythritol, 3 – 8 per cent by weight of dipentaerythritol and 0.5 – 3 per cent by weight of tripentaerythritol is used.

The presence of di - and tripentaerythritol gives a solubility improving effect. Thus, a stabilizer having a higher contact of TMP can be produced than at similar mixtures only consisting of TMP and pentaerythritol. In spite of the higher content of TMP a high melting point of the stabilizer is maintained.

The stabilizer is produced by melting together the alcohol components used, chilling the mixture obtained and disintegrating it to a powder.

The stabilizer according to the invention is intended to be used as secondary stabilizer in combination with the above-mentioned polyvalent metal salts or with other stabilizers. The proportion of the stabilizer is quite conventional, i.e. it is usually between 0.1 and 20 per cent by weight of the amount of resin.

Normally the mixing of metal salts and secondary stabilizers is made separately. Then the ready stabilizer mixture is added to the PVC resin. For example the mixing can be carried out by the help of a two-roll mill and at a temperature where the mass is fluid (about 120°– 230°C). Also other components such as plasticizers, lubricants and mould release agents can be incorporated into the mixture.

The present invention will be elucidated more in detail in connection with the embodiment examples below. Then, examples 1 and 3 show the production of a secondary stabilizer according to the invention. Example 2 is a comparative example illustrating a secondary stabilizer obtained by a simple mixing of the alcohol components used in the process described in example 1. In example 4 it is described how different secondary stabilizers influence on the discoloration of a PVC product. The influence on the light transparency of a PVC product at the use of different secondary stabilizers is described in example 5. In example 6 the possibility to obtain a uniform stabilizer mixture according to the present invention is illustrated.

EXAMPLE 1

In a reactor of 200 liters provided with a heating jacket and an anchor stirrer, 60 kg of TMP was charged and then melted while it was stirred. The temperature was raised and at 120°C 35 kg of pentaerythritol, 4 kg of dipentaerythritol and 1 kg of tripentaerythritol were charged. The temperature was increased further and the stirring was continued. At 160°–170°C the mixture became a transparent solution. The melt was transferred to a cooled rotating roll provided with a scraper. Then the flakes obtained were ground in a mill to a fine powder, which had a particle size less than 150 μm for 98 per cent of the material. The product obtained is called product A below.

EXAMPLE 2

In a powder mixer of the double cone type 6 kg of TMP, 3.5 kg of pentaerythritol, 0.4 kg of dipentaerythritol and 0.1 kg of tripentaerythritol were charged. The mixing course was continued until an even distribution of the components in the mixture had been obtained. The product obtained in this way is called product B below.

EXAMPLE 3

In a reactor of 200 liters provided with a heating jacket and an anchor stirrer, 55 kg of TMP was charged and then melted while it was stirred. The temperature was raised and at 120°C 45 kg of pentaerythritol was charged. The temperature was increased further and the stirring was continued. At about 180°C the mixture became a transparent solution. The melt was transferred to a cooled rotating roll provided with a scraper. Then the flakes obtained were ground in a mill to a fine powder which had a particle size less than 150 μm for 98 per cent of the material. The product obtained is called product C below.

EXAMPLE 4

In a double jacketed mixing vessel provided with a propeller stirrer at the bottom and a double wing propeller above said first propeller, a number of experiments were made. Then 2,000 g of PVC (Pevikon S 602 from Kema Nord), 14 g of montane wax (Vax OP from Farbwerke Hoechst), 6 g of polyethylene wax (Vax PA 190 from Farbwerke Hoechst), 10 g of calcium stearate (from Kebo Grave AB), 10 g of zinc stearate (from Kebo Grave AB) and 4 g of a secondary stabilizer were charged.

At the first experiment no secondary stabilizer was used. At the second experiment flake formed neopentyl glycol (from Eastman Chemical Products Inc.) was used. At the third experiment TMP flakes (from Perstorp AB) were used. Pentaerythritol powder (from Perstorp AB) having a particle size less than 0.074 mm was used in experiment No. 4. At experiment No. 5 sorbitol powder (from Laporte Industries Ltd.) was added. At experiments Nos. 6, 7 and 8, product A, product B and product C respectively were used.

The heating of the vessel was started by introducing warm water into the jacket. At the same time the stirring was started. When the material in the mixer had got a temperature of 110°C the cooling water was fed into the jacket. When the temperature had decreased to 40°C the stirring was interrupted and the vessel was emptied.

300 g of the mixture obtained above was charged between the rolls of a two-roll mill of a conventional laboratory model with a roll diameter of 160 mm. The milling was carried out at 22 rounds per minute. The rolls were heated by steam. The milling temperature was regulated to 170° ± 3°C. A gelatinizing was obtained after 15 – 25 seconds. Then the object was milled for 10 minutes after the gelatinizing. The thickness of the foil was adjusted to about 1 mm.

Owing to the different effectiveness of the secondary stabilizers used, foils having a varying degree of discoloration were obtained. The discoloration of the foil specimens was judged when they had been cooled. The following scale was used where 7 relates to the least discoloration and 1 to the worst discoloration:

| Colour | Colour scale |
|---|---|
| Yellow-white | 7 |
| Yellowish | 6 |
| Weakly yellow | 5 |
| Yellow | 4 |
| Yellow-orange | 3 |
| Weakly orange | 2 |
| Orange | 1 |

In table 1 below the discoloration obtained by using the different secondary stabilizers mentioned above is shown.

Table 1

| Secondary stabilizer | Degree of discoloration |
|---|---|
| None | 5 |
| Neopentyl glycol | 5 |
| TMP | 7 |
| Pentaerythritol | 6 |
| Sorbitol | 5 |
| Product A | 7 |
| Product B | 6 |
| Product C | 7 |

The table shows that TMP, product A and product C give the best stabilizing effect in respect of discoloration.

EXAMPLE 5

Specimens of the foils produced according to example 4 were compared in respect of the light transparency.

To eliminate the influence of irregularities in the surface the specimens were first pressed between glossy plates in a laminate press. The press time was 10 minutes, the moulding pressure 100 kg/cm² and the mouldng temperature 140°C.

The pressed foil specimens were taken out for measuring of the transparency according to ASTM D 1003-61. According to said method the haze of the specimen is used as a measure of the transparency. At said method the percentage part of the entering light, which changes its direction by spreading at the passage of the light through the specimen, is measured. The result of the measure is given in table 2 below.

Table 2

| Secondary stabilizer | Thickness of the specimen, mm | Haze, per cent | Corrected haze[1], per cent |
|---|---|---|---|
| Neopentyl glycol | 1.26 | 40.1 | 31.9 |
| TMP | 1.19 | 46.6 | 39.2 |
| Pentaerythritol | 1.25 | 51.5 | 41.2 |
| Product A | 1.01 | 20.4 | 20.2 |
| Product B | 1.15 | 45.5 | 39.5 |
| Product C | 1.07 | 29.4 | 27.5 |

[1]Calculated as the read value of the haze in per cent divided by the thickness of the specimen in mm.

Table 2 shows that product A gives a considerably lower haze than the other secondary stabilizers.

EXAMPLE 6

The different components which are included in a stabilizer are usually mixed in advance in separate stabilizer factories before they are added to the polymer. The particle size of the different components ought to be about the same. Otherwise a mixture being homogeneous at the beginning can be separated if the mixture is subjected to vibrations. The mixture can easily be subjected to such vibrations and shakings in connection with the transport from the stabilizer factory. The following simple experiment will elucidate said fact.

20 g of a fine powder of calcium stearate, 20 g of a fine powder of zinc stearate and 8 g of TMP in the shape of 3 – 5 mm big flakes were charged into an erlenmeyer flask of 250 ml. The components were mixed homogeneously.

The flask with the mixture was shaken vertically up and down with a frequency of 1 shaking per second and an amplitude of about 5 cm. After less than 1 minute practically all of the flakes of TMP had been collected at the bottom of the flask. The stearates constituted an upper layer.

The same experiment was repeated. However, instead of TMP the same amount of product A was added. After shakings for 2 minutes specimens were taken out partly at the surface partly at the bottom of the powder amount in the flask. These specimens were analyzed gas chromatographically in respect of TMP. The TMP content of the surface specimen was 9.2 per cent by weight. The bottom specimen had a TMP content of 10.5 per cent by weight. The result shows that product A has a considerably less tendency to separate than TMP. Thus, product A is a better stabilizer than TMP.

The invention is not limited to the embodiment examples shown as these can be modified in different ways within the scope of the invention.

I claim:

1. A vinyl chloride polymer containing as a stabilizer the solid product obtained by melting together trimethylol propane and pentaerythritol.

2. The polymer of claim 1 wherein the said solid product is obtained by melting together trimethylol propane, pentaerythritol and a member selected from the group consisting of dipentaerythritol, tripentaerythritol, neopentyl glycol, trimethylol ethane, ditrimethylol propane, mannitol, sorbitol, anhydroennea heptitol, 1,2,6-hexane triol and glycerol.

3. The vinyl chloride polymer of claim 2 containing as a secondary stabilizer a mixture consisting of 74–12 percent by weight of trimethylol propane, 26–75 percent by weight of pentaerythritol, 0–10 percent by weight of dipentaerythritol and 0–3 percent by weight of tripentaerythritol, said mixture having been prepared by melting the said polyhydric alcohols together.

* * * * *